United States Patent

Johnson, Jr. et al.

[11] 4,035,642
[45] July 12, 1977

[54] GAMMA COUNTER APPARATUS

[75] Inventors: Edgar G. Johnson, Jr.; Byron E. Sturgis, both of Huntsville, Ala.

[73] Assignee: Rohm and Haas Company, Philadelphia, Pa.

[21] Appl. No.: 716,313

[22] Filed: Aug. 20, 1976

[51] Int. Cl.² .......................................... G01T 1/00
[52] U.S. Cl. ............................... 250/328; 250/364
[58] Field of Search ........................... 250/328, 364

[56] References Cited

U.S. PATENT DOCUMENTS 3,852,599  12/1974  Smith ........................ 250/328
3,859,528  1/1975   Luitwieler et al. ........... 250/328

Primary Examiner—Harold A. Dixon

[57] ABSTRACT

A gamma activity counter apparatus for use in automated radioimmunoassay systems including a scintillator counter which has two scintillator crystal-photomultiplier tube assemblies removably contained within a lead radiation shield. Each crystal has formed in it a sample receiving zone, each zone communicating with vertical bores formed in the radiation shield, so that a lifting means can lift sample carriers disposed beneath and in alignment with the sample receiving zones into the zones for gamma activity counting. The lift means is so designed that for each counting period, a pair of sample carriers, separated from each other by an even number of sample carrier spaces, is lifted into the sample receiving zones for simultaneous counting, the sample carriers being contained in holders that are continually advanced over the lift means in increments of two sample carrier spaces per increment. The sample carriers, arranged in a specified order in the holders, are counted out of order and this counting data is fed to a logic means in which the data is re-ordered, and this properly re-ordered data is fed to a data printing means.

4 Claims, 3 Drawing Figures

GAMMA COUNTER APPARATUS

This invention relates to a gamma activity counter apparatus for use in automated scintillation counting equipment.

The detection and measurement of radioactivity by use of scintillation counters is routinely conducted in laboratories. The equipment for scintillation counting is commercially available and is capable of unusual precision and accuracy. However, there are situations in which a large number of samples must be counted in an efficient and rapid manner and where it is highly desirable that all equipment associated therewith be as compact as possible.

One area in which scintillation counting is of great significance is radioimmunoassay. Radioimmunoassay is an analytical technique which depends upon the competition between labeled and unlabeled antigen for antigen-binding sites on antibody molecules. In practice, standard curves are contructed from work on a plurality of samples, each containing (a) the same known concentration of antigen labeled with a radioactive isotope tracer, and (b) various, but known, concentrations of unlabeled antigen. The mixture is incubated in contact with an antibody, the free antigen is separated from the antibody and antigen bound thereto, and then, by use of a suitable detector, such as a gamma radiation detector, the percent of either the bound or free labeled antigen is determined. This procedure is repeated for a number of samples containing various known concentrations of unlabeled antigens and the results plotted. The percent of bound tracer antigens is plotted as a function of the antigen concentration. Typically, as the total antigen concentration increases, the relative amount of the tracer antigen bound to the antibody decreases. After the standard graph is prepared, it is used to determine the concentration of antigen in samples undergoing analysis.

In actual analysis, the sample in which the concentration of antigen is to be determined is mixed with the known amount of tracer antigen. Tracer antigen is prepared by labeling the antigen, or suitable derivative thereof, with suitable radioactive isotope. The sample with racer is then incubated in contact with the antibody. Thereafter, it may be counted in a suitable detector which counts the free antigen remaining in the sample. The antigen bound to the antibody or immunoadsorbent may be similarly counted. Then, from the standard curve, the concentration of antigen in the original sample is determined. Afterwards, the antibody or immunoadsorbent mass is discarded.

Under laboratory conditions, many samples may be involved and they are arranged for counting in a very precise order. It is desirable that the gamma activity of the samples be counted and registered as rapidly and accurately as possible. Likewise, it is desirable that the gamma apparatus be no larger than is absolutely necessary. The present invention provides just such a gamma counter apparatus, in that it can form part of an automated device in which it is capable of continuous, automated throughput of large numbers of samples in a relatively small space, with a direct sequential readout of the scintillation counting results.

The gamma activity counter apparatus of the present invention comprises a scintillator counter comprising two photomultiplier tube assemblies, each assembly having a scintillator crystal having a sample receiving zone extending vertically therethrough and a photomultiplier tube, the tube being light-transmissive relation with the scintillator crystal and each crystal being in gamma-transmissive relation with the sample receiving zone therein; a lead radiation shield encasing said photomultiplier tube assemblies, said assemblies being removably contained within said shield and being so positioned therein that each assembly abuts upon the other, and having bores extending upwardly through the radiation shield in alignment with, and communicating with the sample receiving zones; means for lifting into said sample receiving zones a pair of sample carriers from a carrier holder disposed directly beneath and in alignment with said sample receiving zones and for lowering the pair of sample carriers; and means for incrementally and continually advancing said holders into position beneath and in alignment with said sample receiving zones, such that each incremental advance moves the holder the distance of two sample carrier spaces, where for each counting period, for any series of an even number of sample carriers, the first and the last in the series are lifted into said scintillator counter for simultaneous gamma actiity counting.

The various advantages and features of the present invention can be more fully understood from a consideration of the detailed description which follows, taken together with the accompanying drawings wherein one embodiment of the invention is illustrated by way of example, in which.

Figure 1:
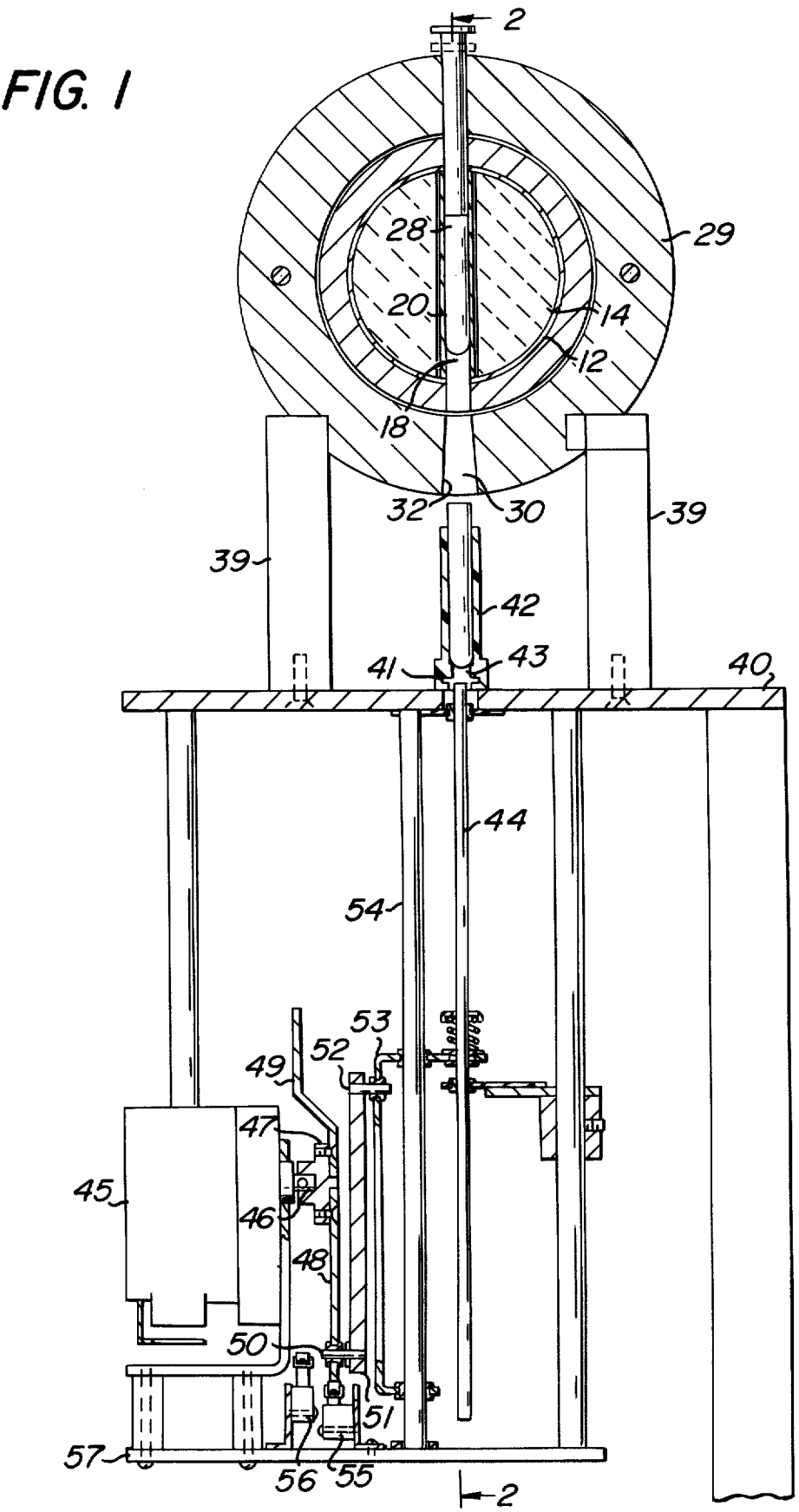
FIG. 1 is a cross-sectional side elevation view of the complete apparatus.
Figures 2, 3:
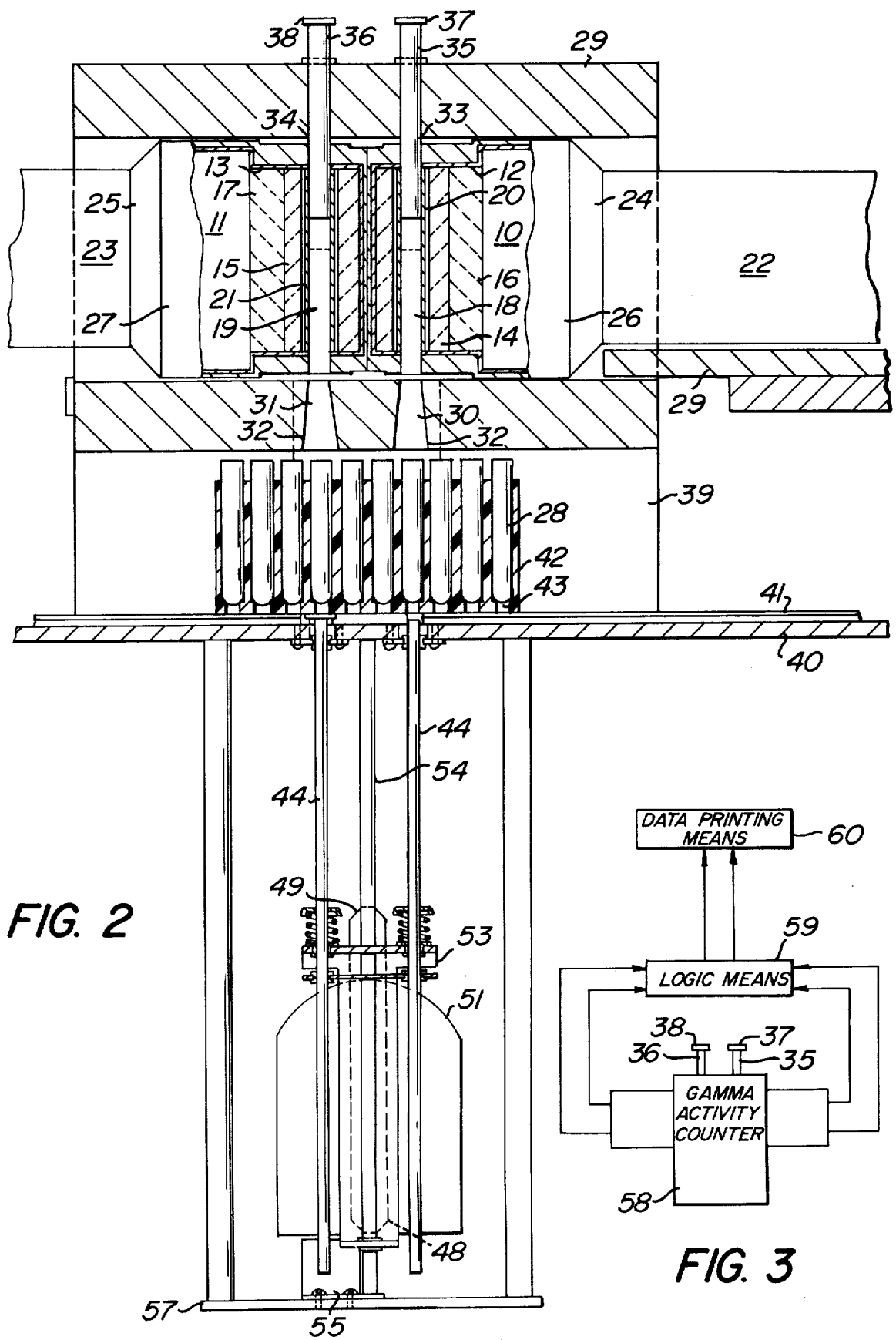
FIG. 2 is a sectional view of the apparatus shown in FIG. 1 taken along line 2—2 in FIG. 1.
FIG. 3 is a plot diagram showing total overall relationships in the apparatus.

Referring now to the drawings in FIG. 2, the scintillator counter consists of two photomultiplier tube assemblies, each assembly including a scintillation crystal assembly 10 and 11 which contains within a metallic housing 12 and 13 a cylindrical scintillator crystal 14 and 15, a terminal light-transmissive window 16 and 17 and a central bore 18 and 19, extending vertically through the scintillator crystal, said bore defining the sample receiving zone. Each sample receiving zone is further fitted with a metallic sleeve 20 and 21. A photomultiplier tube 22 and 23, having a frusto-conical portion 24 and 25 with its broad portion 26 and 27 facing toward the scintillator crystal 24 and 25, the narrower face of the frusto-conical portion facing away from the crystal. In operation, penetrating radiation from a sample 28 in the counter, as shown in FIG. 1, penetrates the metallic sleeve and interacts with the material in the scintillator crystal 14, where it is converted to light flashes which are detected by the photomultiplier tube 22.

The two photomultiplier tube assemblies are removably contained within radiation shield 29, which may comprise any number of individual components capable of housing the tube assemblies. The shield, ideally, excludes all external radiation, so that the photomultiplier tube will respond only to light scintillations produced by interaction of radiation from the sample with a scintillator material present in the sample receiving zone, the metallic housing 12 and 13 preventing "crosstalk," i.e., the situation in which the radiation from a sample in one photomultiplier tube assembly is also counted in the other. In order to permit sample carriers, such as, for example, open-ended test tubes, to be loaded into the sample receiving zones, it it necessary to have bores 30 and 31 which extend upward through the shield 29, these bores being in alignment with and communicating with the sample receiving zones 18 and 19. Various segmented radiation shields are known in the prior art, and many improvements have been made thereto. An assemblable shield which offers no straight-line access for external radiation to enter the sample receiving zones or other radiation-responsive areas when assembled is ideally suited to the present counter apparatus.

In order to facilitate entry of the sample carriers through the radiation shield and into the sample receiving zones, the radiation shield bore openings are countersunk to give the openings a flare 32. Likewise, to prevent sample carriers from hanging up in the sample zones and to aid in their expulsion, each sample receiving zone is provided with the rods shown in FIG. 1. Holes 33 and 34 are formed in the radiation shield, in alignment with the sample receiving zones 18 and 19. Rods 35 and 36 of suitable length extend through these holes, each rod having a stop 37 and 38 attached to the end of that portion of the rod extending through the radiation shield. While a stop attached to the rod end is preferred, any other means of retaining the rod in the sample receiving zones can be used, such as, for example, a retainer pin fitted through the portion of the rod projecting beyond the shield, a retainer collar machined on the projecting rod portion, and the like. A sample carrier lifted into the sample receiving zone pushes the movable rod vertically up within the zone, while when the sample carrier is being lowred out of the zone, the rod exerts a face down on the carrier, helping to expel it from the zone, the stop limiting the downward motion of the rod within the sample receiving zone. While the rod arrangement is preferred, any other means may be employed to help expel carriers from the sample receiving zones.

The scintillation counter, comprising the photomultiplier tube assemblies and radiation shield, rests upon blocks 39 which are fixed to platform 40, which also forms the base for the sample carrier holder transportation system. In order for the gamma activity counter apparatus to function automatically, there must be provided a means for automatically and continually transporting sample carriers in their holders to and from the counter apparatus, as well as a means for lifting sample carriers into and lowering them out of the gamma counter. A preferred transportation system is a "railway" system which may comprise a main linear guide rail along which a holder having a row of sample carriers supported therein is adapted to be moved longitudinally stepwise to transport the carriers in the holders in sequence to a given station or point of operation. The holder is provided with a guide structure along its base by which the holder may be moved longitudinally along the track or rail. Means is also provided for moving the holder along the main rail. In FIGS. 1 and 2, 41 is a section of such a railway system which is attached to platform 40 and runs beneath the gamma counter, in alignment with the bores of the shield and the sample receiving zones. A sample carrier holder 42 cooperatively carried on the railway is incrementally shifted by the distance of an even number of sample carrier spaces per shift, so that sample carriers contained therein are brought and in alignment with the sample receiving zones in the gamma counter. As will be discussed therein, a pair of sample carriers is lifted into the gamma counter, the gamma activity counted, and the samples then lowered back into the holder, after which the next shift by the distance of two sample carrier spaces brings a new pair of sample carriers into alignment with the sample receiving zones. This shifting and counting is carried out automatically and continually so that a large number of samples can be counted, giving rise to an extremely efficient, accurate and very sizable throughput of samples in a short period of time.

A significant feature of the present invention is the spacing of the sample receiving zones in the gamma counter. The purpose of two independent crystals with photomultiplier tubes is to allow two different samples to be counted simultaneously. The crystals are designed so as to have a minimum of space between the sample receiving zones when the crystals are abutted upon each other during assembly of the gamma counter. If adjacent sample carriers in a holder were to be counted simultaneously, the length of the sample holder containing, for example, 10 sample carriers would be 10 times the space between the center lines of the two sample receiving zones. By counting test tubes separated by an even number of sample carrier spaces, the length of the holder can be significantly reduced. Thus, in the 10 sample carrier holder, the length of the holder can be reduced to three and one-third times the spacing between the center lines of the sample receiving zones by the simultaneous counting of the first and fourth sample carriers in a series of four carriers contained in the holder. In this apparatus, holders of any capacity can be employed as long as the number of sample carrier spaces is even. When the holders are continually shifted by the increment of two sample carrier spaces per shift, and counted as outlined immediately above, the counting is carried out automatically, continually, efficiently, with a high throughout in a minimum of space. Lifting and lowering of the sample carriers is preferably effectuated by the mechanism shown in FIGS. 1 and 2; however, any other means which will perform these operations is within the scope of the invention.

The preferred lifting/lowering mechanism is shown in FIGS. 1 and 2. Once a pair of sample carriers is disposed beneath the sample receiving zones, they are ready to be lifted into the gamma counter for activity counting. Holder 42, for example, can have openings 43 in its base, the openings not being sufficiently large as to allow the sample carriers 28 to pass through, yet large enough to allow "fingers" or rods 44 to pass through them. The incremental shifting of the holders is controlled by a logic means which is programmed in such a manner that for every incremental shift of two sample carrier spaces of the holder, drive motor 45 is activated. Drive motor 45 has a shaft 46 which carries a flange 47 to which is attached arm 48 with an offset 49 at one end, while the other end is linked to pin 50, which is fixedly carried by a plate 51. The latter fixedly carries another pin 52 which is linked to carrier frame 53, this frame being slidingly mounted on frame rod member 54 and fixedly carrying fingers 44. Two switches 55 and 56 are attached to platform 57 and are so positioned as to be trippable by one end of arm 48 and the offset 49 thereof, respectively. Fingers 44 pass through openings created in platform 40 and railway section 41. Thus, when drive motor 45 is activated, the arm and linkage arrangement is set in motion, this motion in turn causing carrier frame 53 to be moved in an upward direction, thereby also lifting fingers 44 through the openings in platform 40 and railway section 41. The fingers 44 also pass through openings 43 in the holder 42, these openings being in alignment with those in the platform 40 and railway 41, to contact the bases of a pair of sample carriers 28 and lift them into the sample receiving zones. As the fingers 44 reach their limit of upward motion, offset 49 of arm 48 trips switch 56.

The tripping of switch 56 deactivates drive motor 45, leaving fingers 44 supporting the pair of sample carriers in the sample receiving zones. Drive motor 45 is on a timed delay circuit, whereby after a predetermined period of gamma activity counting time, the motor is reactivated and the lifting mechanism completes its cycle of operation, fingers 44 and carrier frame 53 being vertically returned down to their initial position, bringing the pair of sample carriers back into their initial position in sample carrier holder 42. As the cycle of operation nears its completion, arm 48 trips switch 55, thereby deactivating drive motor 45 and simultaneously reactivating the logic means so as to transport the next pair of sample carriers into position beneath the gamma counter.

Since for every series of an even number of sample carriers, the first and last sample carriers are counted, the carriers are not counted in the order in which they are arranged in the holder. Thus, for example, with a holder having 10 sample carriers, and using the shift of two carrier spaces for a series of four carriers per series, the first incremental shift brings only the second carrier into position beneath only one of the fingers. This carrier is lifted, counted and lowered back into the holder. The next shift brings carriers four and one into position. After they are counted, the next shift brings carriers six and three into position. The next two shifts cause the counting of carriers 8 and 5, and 10 and 7. Since only one holder of ten carriers is being described, the last shift brings only carrier nine into position. The sequence of counting for these ten carriers then is as follows: 2/10, 4/1, 6/3, 8/5, 10/7 and 0/9. If a second holder of 10 carriers follows directly on the first, then the last shift would bring carrier nine of the first holder and carrier two of the second holder into position. Thus, by having holders following immediately upon each other, any number of sample carriers can be counted automatically and continually. Since samples are generally arranged in a given sequence or order, it is necessary to have the final readout of results in that sequence or order. In FIG. 3, the data collected by the out-of-order counting of the carriers in the counter 58 forms the input to a logic means 59. The latter, which can be any device having memory storage and selective retrieval of information from storage, reorders the data counted out of order back to the original order of the carriers in their holder. The output of logic means 59 forms the input to data printing means 60. The total sequence then is that of out-of-order counting in the gamma counter, the output from the latter being, for example, electronic signals received by the logic means, wherein the data is recorded and the output of the logic means being electronic signals which are received by the data printing means and converted to a printed readout. Data counted in the sequence 2/0, 4/1, 6/3, 8/5, 10/7 and 0/9, for example, is then printed as readout in the sequence 1, 2, 3, 4, 5, 6, 7, 8, 9, 10.

Thus, a gamma activity counting apparatus has been provided which does the automatic and continuous counting of large numbers of samples rapidly and efficiently by the simultaneous counting of two samples. By means of sequential ordering of non-sequential counting data, it is possible to obtain precisely ordered data while utilizing sample carrier holders having a minimum length.

Although the present invention has been described in detail in an illustrative embodiment, it is to be understood that the novelty of the invention is not limited to the specific embodiment illustrated and described, but is defined only by the scope of the appended claims.

We claim:

1. A gamma activity counter apparatus for use in automated radioimmunoassay systems which comprises a scintillator counter comprising two photomultiplier tube assemblies, each assembly having a scintillator crystal having a sample receiving zone extending vertically therethrough and a photomultiplier tube, the tube being in light-transmissive relation with the scintillator crystal and each crystal being in gamma-transmissive relation with the sample receiving zone therein; a lead radiation shield encasing said photomultiplier tube assemblies, said assemblies being removvbly contained within said shield and being so positioned therein that each assembly abuts upon the other, and having bores extending through the radiation shield in alignment with, and communicating with the sample receiving zones;

means for lifting into said sample receiving zones a pair of sample carriers for a carrier holder disposed directly beneath and in alignment with said sample receiving zones and for lowering the pair of sample carriers; and means for incrementally and continually advancing said holders into position beneath and in alignment with said sample receiving zones, such that each incremental advance moves the holder the distance of two sample carrier spaces, where for each counting period, for any series of an even number of sample carriers, the first and the last in the series are lifted into said scintillator counter for simultaneous gamma activity counting.

2. The apparatus of claim 1, wherein the scintillator counter further comprises means for aiding expulsion of sample carriers from within said sample receiving zones during unloading.

3. The apparatus of claim 2, where the means for aiding expulsion of sample carriers from said sample receiving zones comprises vertically movable rods within each sample receiving zone, said rods extending through the radiation shield, and having means for limiting the downward motion of said rods within said sample receiving zones.

4. The apparatus of claim 1, further comprising logic means for receiving, in the form of electronic signals, gamma activity data of sample carriers counted out of the order of arrangements of the sample carriers in the holders, and reordering said data to the order of arrangement, and data printing means for receiving, in the form of electronic signals, the reordered gamma activity data from the logic means and converting said electronic signals into a printed readout.

* * * * *